US010336437B2

(12) United States Patent
Mayer et al.

(10) Patent No.: US 10,336,437 B2
(45) Date of Patent: Jul. 2, 2019

(54) METHOD TO MEASURE AIRCRAFT HIGH-LIFT SYSTEM BRAKE RESPONSE TIME

(71) Applicant: HAMILTON SUNDSTRAND CORPORATION, Charlotte, NC (US)

(72) Inventors: Timothy Michael Mayer, Belvidere, IL (US); Artemio Pérez, Loves Park, IL (US); Victor Barger, Lake in the Hills, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/587,546

(22) Filed: May 5, 2017

(65) Prior Publication Data
US 2018/0319483 A1 Nov. 8, 2018

(51) Int. Cl.
B64C 13/50 (2006.01)
B60T 8/17 (2006.01)
(Continued)

(52) U.S. Cl.
CPC ............ B64C 13/50 (2013.01); B60T 8/1703 (2013.01); B60T 8/885 (2013.01); B60T 17/221 (2013.01);
(Continued)

(58) Field of Classification Search
CPC .. B64C 13/50; B64C 9/18; B64C 9/24; H02K 11/21; H02K 11/24; H02K 7/102;
(Continued)

(56) References Cited

U.S. PATENT DOCUMENTS 6,824,099 B1 * 11/2004 Jones ...................... B64C 13/28
244/203
7,720,579 B2 5/2010 Goodman et al.
(Continued)

FOREIGN PATENT DOCUMENTS

EP 2240365 A2 10/2010
EP 2364913 A2 9/2011
(Continued)

OTHER PUBLICATIONS

European Search Report for Application No. 18170638.3-1010 dated Sep. 17, 2018; 7 pgs.

Primary Examiner — Tuan C To
(74) Attorney, Agent, or Firm — Cantor Colburn LLP

(57) ABSTRACT

A braking test for a high lift system. The system including a plurality of high lift surfaces movably arranged at a wing, a plurality of drive stations coupled with the high lift surfaces via a transmission shaft, a power drive unit coupled with the transmission shaft including an electric motor operably coupled with a brake, and a control unit operably coupled to the power drive unit. The control unit executing a method for testing the brake, including actuating an electric motor, acquiring a sensor output of a sensor coupled during the actuating of the motor and determining a motion of the motor, activating a selected brake under test, measuring an elapsed time until the brake has arrested the motion, and determining if the elapsed time is less than a threshold. Generating a brake failure signal for the selected brake if the elapsed time exceeds the threshold.

20 Claims, 2 Drawing Sheets

(51) Int. Cl.
| | |
|---|---|
| *B60T 8/88* | (2006.01) |
| *B64F 5/60* | (2017.01) |
| *H02K 11/21* | (2016.01) |
| *H02K 11/24* | (2016.01) |
| *B60T 17/22* | (2006.01) |
| *B64C 9/18* | (2006.01) |
| *B64C 9/24* | (2006.01) |
| *B64D 45/00* | (2006.01) |
| *H02K 7/102* | (2006.01) |
| *H02K 7/14* | (2006.01) |
| *H02P 29/024* | (2016.01) |
| *H02P 29/04* | (2006.01) |

(52) U.S. Cl.
CPC .............. *B64C 9/18* (2013.01); *B64C 9/24* (2013.01); *B64C 13/503* (2013.01); *B64D 45/00* (2013.01); *B64F 5/60* (2017.01); *H02K 7/102* (2013.01); *H02K 7/14* (2013.01); *H02K 11/21* (2016.01); *H02K 11/24* (2016.01); *H02P 29/024* (2013.01); *H02P 29/04* (2013.01); *B60T 2270/406* (2013.01); *B64D 2045/0085* (2013.01)

(58) Field of Classification Search
CPC ....... H02K 7/14; B60T 8/1703; B60T 17/221; B60T 2270/406; B60T 2045/0085; B64D 45/00; H02P 29/024; H02P 29/04
See application file for complete search history.

(56) References Cited

U.S. PATENT DOCUMENTS

| | | | |
|---|---|---|---|
| 8,463,462 B2 | 6/2013 | Cahill | |
| 8,683,857 B2 | 4/2014 | Cahill | |
| 8,712,626 B2 | 4/2014 | Cahill et al. | |
| 8,903,569 B2 * | 12/2014 | Ruckes | B64C 19/00 244/10 |
| 9,211,878 B2 | 12/2015 | Kreienheder | |
| 9,280,858 B2 | 3/2016 | Cahill | |
| 2004/0195441 A1 * | 10/2004 | Wingett | B64C 13/42 244/99.5 |
| 2010/0100225 A1 * | 4/2010 | Reed | B64D 9/00 700/213 |
| 2010/0292889 A1 | 11/2010 | Cahill et al. | |
| 2011/0219863 A1 * | 9/2011 | Whatley | B26B 21/14 73/121 |
| 2012/0312931 A1 * | 12/2012 | Recksiek | B64C 9/16 244/203 |
| 2013/0166111 A1 * | 6/2013 | Ruckes | B64C 19/00 701/3 |
| 2014/0257713 A1 * | 9/2014 | Kreienheder | B60T 1/16 702/33 |
| 2015/0066288 A1 | 3/2015 | Catt et al. | |
| 2015/0360769 A1 * | 12/2015 | Dege | B64C 13/28 244/213 |
| 2016/0031546 A1 * | 2/2016 | Rolston | B64C 3/58 244/213 |
| 2016/0031554 A1 * | 2/2016 | Eshkenazy | B64C 39/024 244/6 |
| 2016/0114904 A1 * | 4/2016 | Neb | B64C 9/20 701/3 |
| 2016/0176539 A1 * | 6/2016 | Van Bruggen | B64D 45/00 701/33.9 |
| 2016/0176540 A1 * | 6/2016 | Fleddermann | B64D 45/00 701/33.9 |
| 2016/0272300 A1 * | 9/2016 | Matsui | B64C 13/503 |
| 2017/0073082 A1 * | 3/2017 | Ungar | B64D 45/0005 |
| 2017/0088252 A1 * | 3/2017 | Chavignier | B64C 13/28 |
| 2017/0174201 A1 * | 6/2017 | Georgin | B60T 8/1703 |
| 2017/0350491 A1 * | 12/2017 | Wilkens | F16H 49/001 |

FOREIGN PATENT DOCUMENTS

| | | | | |
|---|---|---|---|---|
| EP | 2894359 A1 * | 7/2015 | | B64C 9/16 |
| EP | 2930102 A1 * | 10/2015 | | B64C 9/12 |
| EP | 3037346 A1 | 6/2016 | | |
| WO | 2009083261 A2 | 7/2009 | | |

* cited by examiner

METHOD TO MEASURE AIRCRAFT HIGH-LIFT SYSTEM BRAKE RESPONSE TIME

TECHNICAL FIELD

This disclosure relates to a method for testing a component in a high lift system of an aircraft, a high lift system of an aircraft as well as an aircraft having at least one such high lift system. The disclosure can also be applicable to other systems including, but not limited to, horizontal stabilizers, utility actuators, and the like, which rely on a brake response time as a critical function of its operating performance.

BACKGROUND

Typically, high lift systems of commercial and military aircraft are powered by a centralized drive, also known as a power drive unit (PDU). Such drives are mounted in a central region of the fuselage: and are controllable through a computerized control system or electronics unit. The PDU is coupled with a torque shaft system, also known as transmission shaft, which transfers mechanical power to geared actuators at flap or slat panel drive stations distributed along the trailing edge or leading; edge of a wing. The control of the PDU is usually conducted by control computers, such as slat flap electronic control computers/unit (SFECU), which are commonly realized as a redundant arrangement of at least two independent SFECUs that are not only able to control but also to monitor the operation of the high lift system.

The PDU commonly comprises two independent motors that may be hydraulic or electric, which may be coupled with an output shaft by means of a speed summing differential gear. Each of the motors is provided with a power off brake (POB) for arresting the motor in a commanded position. In some systems, while at least one of the two motors is commonly a hydraulic motor, the second motor may be realized as an electric motor, leading to a hybrid PDU. A wing tip brake, which is coupled with the transmission shaft and particularly placed in an outer region of the transmission shaft and/or in a tip region of the respective wing, is also capable of arresting and holding the transmission shaft. Each of the wing tip brakes are power off brake (POB) which arrest the system in an existing position.

Still further, high lift systems usually comprise torque limiters that are adapted for limiting the torque to be introduced into the transmission system. The torque limiters may be mechanical or electronic torque limiters, wherein the latter rely on constantly monitoring an introduced torque, taking authority over the motors of the PDU, and initiating limitation and/or a reversal once the torque exceeds a predetermined threshold. The torque limiters can be separate elements or integrated into the PDU.

High-lift systems often rely on specific brake engagement response times to mitigate failure scenarios such as un-commanded motion, asymmetry and flap/slat panel skew. In such failure scenarios if a monitored parameter of the system is found to be out of an acceptable range, the high-lift system annunciates the failure condition and commands the system brakes to engage preventing further motion. System parameters and functions such as threshold values, fault monitoring, fault persistence, brake electrical control circuits, and the brake itself all contribute to the overall response time of the brake to arrest the system. Moreover, brake systems can develop degraded performance over life due to electrical variations, mechanical wear and environmental exposure all of which will increase the brake's engagement response time. Degraded brake response times may prevent or degrade a high-lift system from mitigating a given failure scenario resulting in risk to the aircraft. As such, the need for a method to measure a high-lift system's brake response time to arrest motion as a system without the need for ground test equipment would be a useful tool in mitigating certain failure modes.

BRIEF DESCRIPTION

According to one embodiment of the invention, described herein is a braking test for a high lift system. The system including a plurality of high lift surfaces movably arranged at a wing, a plurality of drive stations coupled with the high lift surfaces via a transmission shaft, a power drive unit coupled with the transmission shaft including an electric motor operably coupled with a brake, and a control unit operably coupled to the power drive unit. The control unit executing a method for testing the brake, including actuating an electric motor, acquiring a sensor output of a sensor coupled during the actuating of the motor and determining a motion of the motor, activating a selected brake under test, measuring an elapsed time until the brake has arrested the motion, and determining if the elapsed time is less than a threshold. Generating a brake failure signal for the selected brake if the elapsed time exceeds the threshold.

A method for testing a component in a high lift system of an aircraft. The high lift system comprising a central power drive unit for moving high lift surfaces arranged at a wing through providing rotational power by means of a transmission shaft to a plurality of drive stations operably coupled with the high lift surfaces; which power drive unit is operatively coupled to a controller and comprises at least one electric motor coupled with a selectively activated brake. The method including actuating the at least one electric motor for a predetermined period of time with all brakes in the system deactivated, acquiring a sensor output of a sensor coupled with the controller during the actuating of the motor and determining a motion of at least one of the motor and the high lift surfaces based on the acquired sensor output, activating a selected brake under test, measuring an elapsed time until the selected brake has arrested the motion of at least one of the motor and the high lift surfaces, determining if the that the elapsed time is less than a predetermined threshold value, and generating a brake failure signal for the selected brake if the elapsed time exceeds the predetermined threshold value.

In addition to one or more of the features described above, or as an alternative, further embodiments may include moving the high lift surfaces to a selected position before activating the selected brake.

In addition to one or more of the features described above, or as an alternative, further embodiments may include that the selected position is at least one of a fully extended position and a neutral position.

In addition to one or more of the features described above, or as an alternative, further embodiments may include conducting at least one of a system functional test, power on reset built in test, and an initiated built in test.

In addition to one or more of the features described above, or as an alternative, further embodiments may include at least one of ensuring established preconditions for conducting the testing have been satisfied defining maximum torque for a selected brake under test, and releasing all system brakes.

In addition to one or more of the features described above, or as an alternative, further embodiments may include that the activating the brake is conducted a selected duration after the actuating the at least one electric motor.

In addition to one or more of the features described above, or as an alternative, further embodiments may include that the selected duration is at least TBD seconds.

In addition to one or more of the features described above, or as an alternative, further embodiments may include that the acquiring includes measuring at least one of a displacement and a speed of the high lift surface based on the actuation of the motor.

In addition to one or more of the features described above, or as an alternative, further embodiments may include that the selected threshold is less than at least one of about TBD seconds and about TBD seconds.

In addition to one or more of the features described above, or as an alternative, further embodiments may include repeating the method for another brake in the high lift system.

In addition to one or more of the features described above, or as an alternative, further embodiments may include that the method is conducted after landing of the aircraft while at least one of the high lift surfaces are in an extended position and the high lift surfaces are moved into a neutral position.

Also described herein in an embodiment is a high lift system of an aircraft, including a plurality of high lift surfaces movably arranged at a wing, a plurality of drive stations coupled with the high lift surfaces a transmission shaft coupled with the plurality of drive stations a power drive unit coupled with the transmission shaft for moving the high lift surfaces, the power drive unit comprising at least one electric motor operably coupled and with a brake, and a control unit. The control unit operably coupled to the power drive unit, the control unit configured to execute a method for testing a component in a high lift system of an aircraft. The method including, actuating the at least one electric motor for a predetermined period of time with all brakes deactivated, acquiring a sensor output of a sensor coupled with the controller during the actuating of the motor and determining a motion of at least one of the motor and the high lift surfaces based on the acquired sensor output, activating a selected brake under test, measuring an elapsed time until the brake has arrested the motion, and determining if the elapsed time is less than a predetermined threshold value, and generating a brake failure signal for the selected brake if the elapsed time exceeds the predetermined threshold value.

In addition to one or more of the features described above, or as an alternative, further embodiments may include the controller executing a previous step of moving the high lift surfaces to a selected position before activating the at least one brake.

In addition to one or more of the features described above, or as an alternative, further embodiments may include the controller executing a step of conducting at least one of a system functional test, power on reset built in test, and an initiated built in test.

In addition to one or more of the features described above, or as an alternative, further embodiments may include that the activating the brake is conducted a selected duration after the actuating the at least one electric motor.

In addition to one or more of the features described above, or as an alternative, further embodiments may include that the selected duration is at least TBD seconds.

In addition to one or more of the features described above, or as an alternative, further embodiments may include that the acquiring includes measuring at least one of a displacement and a speed of the high lift surface based on the actuation by the motor.

In addition to one or more of the features described above, or as an alternative, further embodiments may include that the selected threshold is less than at least one of about TBD seconds, about TBD seconds, and about TBD seconds.

In addition to one or more of the features described above, or as an alternative, further embodiments may include that the method is conducted after landing of the aircraft while at least one of the high lift surfaces are in an extended position and the high lift surfaces are moved into a neutral position.

In addition to one or more of the features described above, or as an alternative, further embodiments may include that the high lift surfaces are at least one of trailing edge flaps and leading edge slats.

In addition to one or more of the features described above, or as an alternative, further embodiments may include that the control unit is integrated into a control computer for controlling the high lift surfaces.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
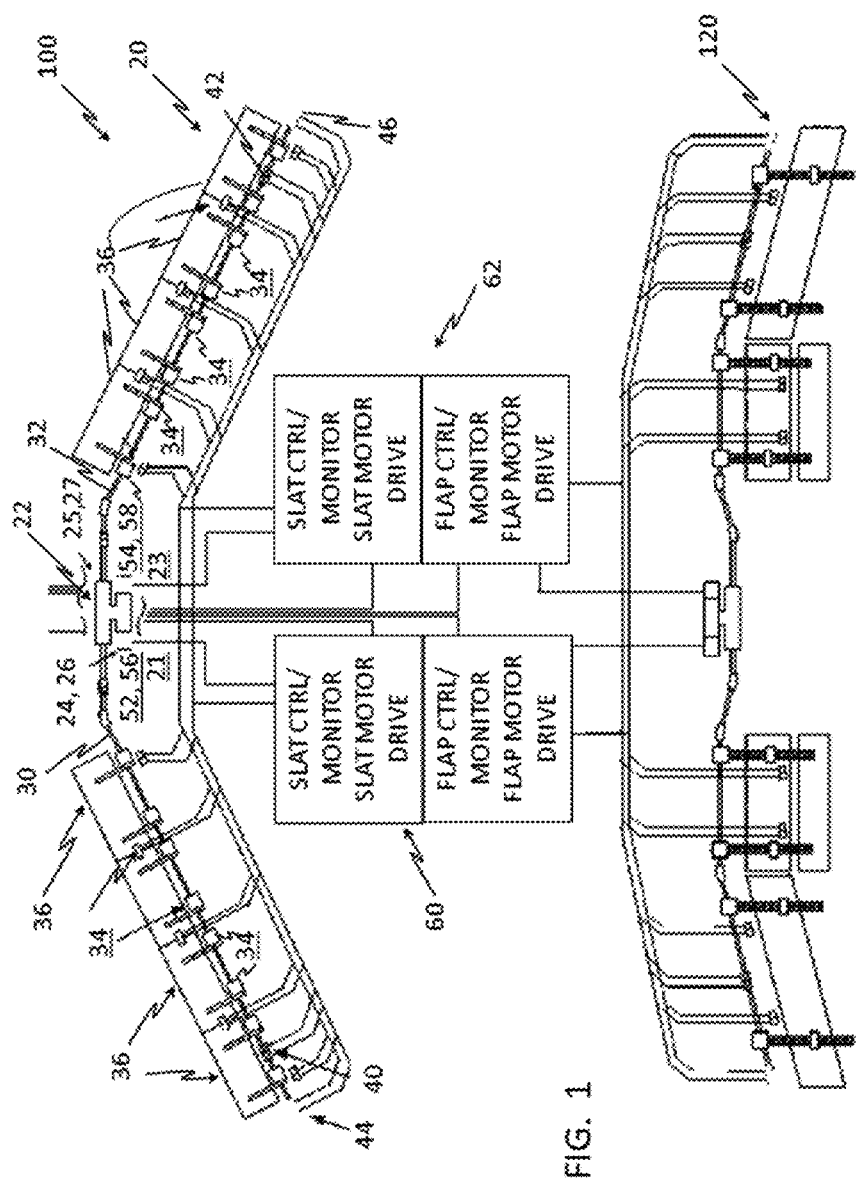
FIG. 1 depicts a simplified system schematic of high-lift system on an aircraft as employed in the embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In general, embodiments herein relate generally to a system level approach to test and detect that the brake response time in a high-lift system has exceeded allowable limits. Advantageously the described embodiments employ an automated system level Built In Test (BIT) methodology eliminating the need for ground test equipment. Furthermore, the described embodiments consider all system level components that may contribute to the brake response time, whereas conventional brake response test methods typically measure only the contribution from the mechanical brake.

In FIG. 1, a general setup of a high lift system 100 is shown in an exemplary leading edge slat system 20 and trailing edge flap system 120. While the description provided herein and depicted in FIG. 1 is directed to an exemplary leading edge slat system, it should be readily appreciated that it is equally applicable to the trailing edge flap system 120 without any loss of generality. For better understanding of the described embodiments and simplification of the figures and description further detail with respect to the trailing edge flap system 120 has been omitted to avoid repetition.

A power drive unit (PDU) 22 comprises a plurality of electric motors 24, 25 or hydraulic motors. In an embodiment two electric motors 24, 25 are in employed on each PDU 22, but various numbers of motors may be employed depending on the needs of the application. Further, in an embodiment, while electric motors are described. It should also be appreciated that the description provided herein is equally applicable to hydraulic motors without any loss of generality. A power off brake 26, 27 is coupled with each of the electric motor(s) 24, 25 respectively, as a means to stop and maintain PDU output. The PDU outputs are coupled, through the PDU, to a transmission shaft system 30, 32 that extends along the leading edge of each wing. Each of the transmission shafts 30, 32 is coupled with several drive stations 34 distributed along the respective wing half, wherein each of a plurality of movably supported high lift surfaces 36 is driven by two or more individual drive stations 34. In the figure, four high lift surfaces 36 (e.g., slats) are depicted for each wing half, though any number may be employed.

Each of the transmission shafts 30, 32 also includes a wing tip brake 40, 42 in a region around the outer end of each of the shafts 30, 32, which may be at an outer end of the respective wing. Typically, the location of the wingtip brake 40, 42, is at the end of the driveline. However, some applications may require the wingtip brake 40, 42 to be installed inboard of the most outboard actuator due to restrictions in envelope, structure, and the like at the end of the wing. Also, each transmission shaft 30, 32 is exemplarily coupled with an position sensor 44, 46 arranged at an outermost end of the respective shaft 30, 32 providing position feedback of the system and allowing the detection of asymmetry conditions between both transmission shafts 30, 32 and, respectively, the drive stations 34 of both wing halves.

The system 100 may further comprise a feedback position sensor or pickoff unit 52, 54 that allows monitoring the of the transmission shafts 30, 32 at or near the output of the PDU 22. Torque sensor units 56, 58 arranged at the transmission shafts 30, 32 or within the PDU 22, monitor the torque that is introduced into the transmission shafts 30, 32. All of the position pickoff units 44, 46, the feedback position pickoff unit 52, 54, and the torque sensor units 56, 58 are coupled with two control units 60, 62, which are exemplarily realized as a first slat flap electronic control unit (SFECU) 60 and a second SFECU 62. While identified separately for the purposes of description of the embodiments herein, it should be appreciated that the PDU 22 and SFECU 60, 62 could be integrated or their functions redistributed. The torque in the transmission shafts 30, 32 of each wing is exemplarily limited through a torque limiter (TL) functionality, in which the torque sensor units 54, 56 detect the introduced torque. If the torque in one of the transmission shafts 30, 32 exceeds a certain torque threshold the PDU 22 is either stopped or, in some embodiments, a rapid speed decrease or reversal of the PDU motors is conducted, leading to controlling the torque to an uncritical level. Finally the system 100 may be arrested through engaging the brake 26, 27 associated with each of the motors 24, 25 and the asymmetry brakes 40, 42. The electric motors 24, 25 may be a brushless direct current (BLDC) motors controlled through a digital drive control, coupled with the SFECUs 60 and 62.

In a default high lift operating mode, the wing tip brakes 40, 42 and motor brakes 26, 27 are released and the motors 24, 25, controlled by SFECUs 60, 62, provides power to the PDU 22, which provides sufficient mechanical power to operate the high lift system 100 at a commanded speed into any commanded position. Once near the commanded position the SFECUs 60, 62 decelerate the motors 24, 25 reducing the output of the PDU 22 to decelerate the high lift system 100. Once at the commanded position the system brakes 26, 27 are engaged to stop and hold the position of the high lift system 100.

Figure 2:
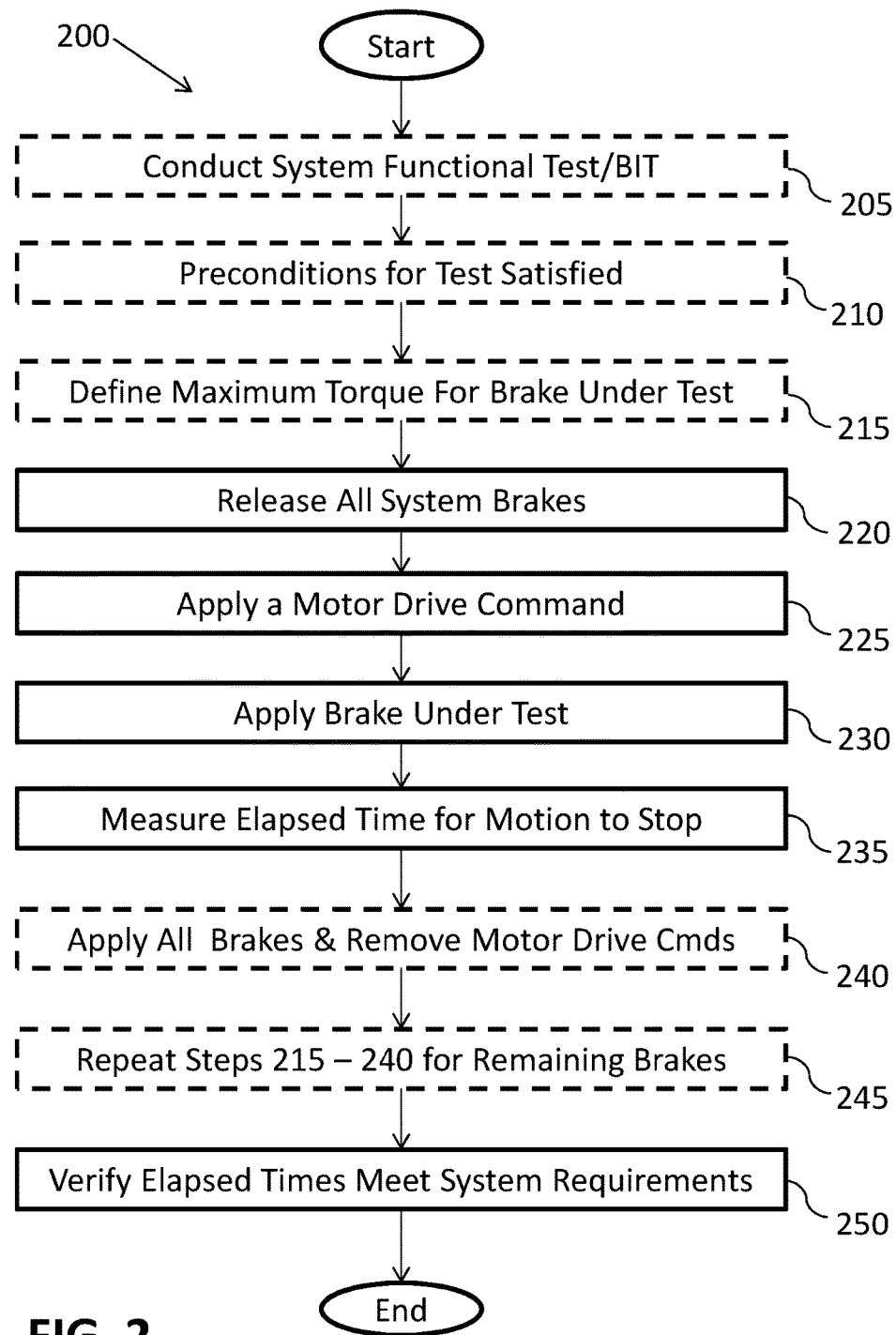
FIG. 2 is a flowchart of methods of measuring high-lift brake response time in accordance with an embodiment.

Turning now to FIG. 2 for depiction of the method 200 of measuring aircraft high lift system brake response time in accordance with an embodiment. In order to conduct the brake response time testing of the methodology 200 the proper function and operation of the high-lift system is first verified employing a standard functional, operational or acceptance test as depicted at optional process step 205. It should be appreciated that while it is not necessary to conduct the system function test prior to brake response time testing, conducting functional test of the system is advantageous to ensuring accurate results without erroneous failures. In addition, conducting a system operation test first facilitates trouble shooting to identify the root cause of a system failure. Such testing of the various components and contributors of the high-lift system 100 may be conducted via existing testing techniques including standard power on reset BIT (PORBIT) or more extensively based on a ground based initiated built in test IBIT. In an embodiment the testing described could be conducted once an aircraft has landed (weight on wheels).

In operation this testing may be conducted as part of a standard ground BIT. In another embodiment, the method may be integrated with a common functional sequence in operation. For example in an embodiment, the method 200 may be conducted directly after landing, when the high lift surfaces 36 are still extended as depicted in process step 310. Other conditions for engaging the test might include aircraft weight on wheels, and airspeeds less than a selected value, e.g., <50 knots. For example, in an embodiment, a normal system command is received to return the wing high lift surface to the retracted position. The system would respond normally to the command as depicted in process step 205. The motion (all system brakes 26, 27, 40, and 42 are released and the motor is operating at normal rate) will continue until the system reaches the commanded position. Once near the commanded position the torque maximum torque output for the brake under test is determined and output by the SFECUs 60, 62.

The method 200 may be used to test power drive motor brakes 26, 27 or asymmetry brakes 40, 42. In an embodiment the method 200 is executed in the SFECU 60 and/or 62, respectively when preconditions for the test are satisfied. The preconditions may be optional or required to establish that the aircraft conditions are acceptable for the test to be conducted, typically ground maintenance mode, and there are no human factor risks, depicted as process step 210.

Once the preconditions are satisfied SFECUs 60 and 62 conducts a sequence of steps for each of the system brakes. The first step, depicted at process step 215 is to optionally establish a selected maximum system torque value for testing the brake under test, which ensures the brake under test (motor brake 26, 27 or asymmetry brakes 40, 42) or other aircraft components will not be mechanically damaged due to conducting the rate response testing of the method 200. At process step 220 all of the system brakes are released, allowing high lift system 100 and actuators 24, 25 to be moved. With the system brakes 26, 27, 40, 42 released the motor drive in the PDU 22 is commanded to move the system at a rate sufficient to determine brake response time, as depicted in process step 225. After some delay to ensure the motors are moving at full speed, but well within the range of travel of the system, the test of the brake response time of a first brake under test (e.g. one of motor brakes 26, 27 or asymmetry brakes 40, 42) is initiated. In one embodiment, the delay is about one or two seconds is employed.

At the position where brakes are to be engaged to stop and hold the system only the brake under test is commanded to engage. While monitoring system speed via a position feedback sensor 52 or 54, the brake under test is commanded to engage as depicted in process step 230. The commands can come from the SFECS 60 and/or 62. At process step 235 of the method 200 the speed of the system is recorded and monitored between the time starting from the brake engagement in process step 230 (time zero) until the system comes to stop is measured. Once the system is stopped by the brake under test or a maximum response time is exceeded all of the system brakes are engaged and the motor drive commands are removed as depicted in process step 240. If the detected motion exceeds an application specific threshold, e.g. a rotation of the motor 22 in the PDU 22, a brake indication signal is generated. The commandment of the motor 24, 25, may be conducted for a couple of seconds, e.g. 3, 4 or 5 seconds, which allows to reliably identify any dormant undesired condition of the power off brake 26, 27. In an embodiment, the threshold is application specific depending on the system, the actuator and its configuration, and the brake being tested. Different system and aircraft configurations may require different thresholds. Ultimately what is desired is that the brake arrests motion prior to the high lift control surface 36 e.g., a flap or slat moving an objectionable amount. One measure of an objectionable amount would be if the control surface moved enough to impact aircraft handling or flying quality.

The steps depicted in process steps 210 through 240 are repeated for the remaining system brakes until all system brakes are tested. Once all system brakes are tested, process step 250 evaluates if the engagement time for each system brake is within the allowable limits required. Any brake which does not engage in the application specific amount of time is identified as failed and requires further maintenance or replacement prior to the next dispatch of the aircraft.

Continuing with FIG. 2, one method is identified, in an embodiment, to facilitate performing the test, one method employed is using a maintenance mode. Other embodiments could be to simulate an out-of-acceptable range sensor parameter to a system monitor function of the SFECS 60 and/or 62 such that a system shut down is annunciated. In one embodiment, the point in time which the out of range parameter is simulated is recorded as time "zero". In an embodiment an asymmetric condition is simulated by adjusting a wingtip position sensor parameter, however other high-lift system parameters such as skew sensor displacement, and the like may also be employed. With the simulated out of range parameter the high-lift system 100 in response annunciates a failure and the SFECS 60 and/or 62 commands the brakes 26, 27, 40, and 42 to arrest the actuation in the system 100. While monitoring the movement of the motor 24, 25 and high lift surfaces 36 driven by drive stations 34, the method 200 continues with process step 235 by monitoring and recording the elapsed time and displacement when the system (i.e., the surfaces 36) reach zero speed and monitoring the current waveforms of each brake to identify the EMF of the solenoid as it moves within the brake coil. As depicted at process step 230, the total elapsed time for motion to stop and/or for each brake solenoid to engage is verified against requirements for the high-lift system 100 to ensure that the system is operating with specifications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for testing a component in a high lift system of an aircraft, the high lift system comprising a central power drive unit for moving high lift surfaces arranged at a wing through providing rotational power by means of a transmission shaft to a plurality of drive stations operably coupled with the high lift surfaces; which power drive unit is operatively coupled to a controller and comprises at least one electric motor coupled with a selectively activated brake; the method comprising:
   actuating the at least one electric motor for a predetermined period of time with all brakes in the system deactivated;
   acquiring a sensor output of a sensor coupled with the controller during the actuating of the motor and determining a motion of at least one of the motor and the high lift surfaces based on the acquired sensor output;
   activating a selected brake under test:
   measuring an elapsed time until the selected brake has arrested the motion of at least one of the motor and the high lift surfaces;
   determining if the that the elapsed time is less than a predetermined threshold value; and
   generating a brake failure signal for the selected brake if the elapsed time exceeds the predetermined threshold value.

2. The method of claim 1, further comprising moving the high lift surfaces to a selected position before activating the selected brake.

3. The method of claim 2, wherein the selected position is at least one of a fully extended position and a neutral position.

4. The method of claim 1, further comprising conducting at least one of a system functional test, power on reset built in test, and an initiated built in test.

5. The method of claim 1, further comprising at least one of ensuring established preconditions for conducting the testing have been satisfied defining maximum torque for a selected brake under test, and releasing all system brakes.

6. The method of claim 1, wherein the activating the brake is conducted a selected duration after the actuating the at least one electric motor.

7. The method of claim 6, wherein the selected duration is at least long enough to ensure the at least one electric motor is moving at full speed.

8. The method of claim 1, wherein the acquiring includes measuring at least one of a displacement and a speed of the high lift surface based on the actuation of the motor.

9. The method of claim 1, wherein the predetermined threshold is application specific depending on the system, the actuator, and the brake under test.

10. The method of claim 1 further including repeating the method for another brake in the high lift system.

11. The method of claim 1, wherein the method is conducted after landing of the aircraft while at least one of the high lift surfaces are in an extended position and the high lift surfaces are moved into a neutral position.

12. A high lift system of an aircraft, comprising:
   a plurality of high lift surfaces movably arranged at a wing;
   a plurality of drive stations coupled with the high lift surfaces;
   a transmission shaft coupled with the plurality of drive stations;
   a power drive unit coupled with the transmission shaft for moving the high lift surfaces, the power drive unit comprising at least one electric motor operably coupled and with a brake; and
   a control unit, the control unit operably coupled to the power drive unit, the control unit configured to execute a method for testing a component in a high lift system of an aircraft, the method including: actuating the at least one electric motor for a predetermined period of time with brakes deactivated, acquiring a sensor output of a sensor coupled with the controller during the actuating of the motor and determining a motion of at least one of the motor and the high lift surfaces based on the acquired sensor output, activating a selected brake under test, measuring an elapsed time until the brake has arrested the motion, and determining if the elapsed time is less than a predetermined threshold value, and generating a brake failure signal for the selected brake if the elapsed time exceeds the predetermined threshold value.

13. The high lift system of claim 12, further comprising the controller executing a previous step of moving the high lift surfaces to a selected position before activating the at least one brake.

14. The high lift system of claim 12, further comprising the controller executing a step of conducting at least one of a system functional test, power on reset built in test, and an initiated built in test.

15. The high lift system of claim 12, wherein the activating the brake is conducted a selected duration after the actuating the at least one electric motor.

16. The high lift system of claim 15, wherein the selected duration is at least long enough to ensure the at least one electric motor is moving at full speed.

17. The high lift system of claim 12, wherein the acquiring includes measuring at least one of a displacement and a speed of the high lift surface based on the actuation by the motor.

18. The high lift system of claim 12, wherein the predetermined threshold is application specific depending on the system, the actuator, and the brake under test.

19. The high lift system of claim 12, wherein the method is conducted after landing of the aircraft while at least one of the high lift surfaces are in an extended position and the high lift surfaces are moved into a neutral position.

20. The high lift system of claim 12, wherein the high lift surfaces are at least one of trailing edge flaps and leading edge slats.

* * * * *